United States Patent
Lewis et al.

(10) Patent No.: US 9,874,989 B1
(45) Date of Patent: Jan. 23, 2018

(54) PROVIDING CONTENT PRESENTATION ELEMENTS IN CONJUNCTION WITH A MEDIA CONTENT ITEM

(71) Applicant: Google Inc., Mountain View, CA (US)

(72) Inventors: Justin Lewis, Marina Del Rey, CA (US); Ruxandra Georgiana Paun, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 267 days.

(21) Appl. No.: 14/091,338

(22) Filed: Nov. 26, 2013

(51) Int. Cl.
| | | |
|---|---|---|
| *G06F 3/0481* | (2013.01) | |
| *G06F 3/048* | (2013.01) | |
| *G06Q 50/00* | (2012.01) | |
| *G06Q 30/06* | (2012.01) | |
| *H04H 60/33* | (2008.01) | |
| *G06F 3/0484* | (2013.01) | |
| *G06F 17/30* | (2006.01) | |

(52) U.S. Cl.
CPC .......... *G06F 3/048* (2013.01); *G06F 3/04812* (2013.01); *G06F 3/04842* (2013.01); *G06F 17/30038* (2013.01); *G06F 17/30997* (2013.01); *G06Q 30/0631* (2013.01); *G06Q 50/01* (2013.01); *H04H 60/33* (2013.01)

(58) Field of Classification Search
CPC .......... G06F 3/04842; G06F 17/30038; G06F 17/30997; G06F 3/04812; G06Q 30/0631; G06Q 50/01; H04H 60/33
See application file for complete search history.

(56) References Cited

U.S. PATENT DOCUMENTS

| | | | | |
|---|---|---|---|---|
| 8,826,135 | B1 * | 9/2014 | Durham et al. | 715/716 |
| 9,542,482 | B1 * | 1/2017 | Sachan | G06F 17/3071 |
| 9,800,458 | B1 * | 10/2017 | Dantas de Castro | H04L 41/0233 |
| 2004/0199697 | A1 * | 10/2004 | Meynard | G06F 9/4418 710/303 |
| 2007/0130015 | A1 * | 6/2007 | Starr | G06Q 30/02 705/14.46 |
| 2008/0109306 | A1 * | 5/2008 | Maigret | G06F 21/10 705/14.46 |
| 2009/0099919 | A1 * | 4/2009 | Schultheiss | G06Q 10/00 705/14.1 |
| 2009/0150947 | A1 * | 6/2009 | Soderstrom | 725/93 |

(Continued)

OTHER PUBLICATIONS

"Available" and "Provide," (2011), The Editors of the American Heritage Dictionaries and TheEditorsoftheAmericanHeritageDictionaries (Eds.), The American Heritage Dictionary of the English language. Boston, MA: Houghton Mifflin. Retrieved from http://search.credoreference.com/content/entry/hmdictenglang/available/0 and .../provide/0 on Aug. 7, 2015.*

*Primary Examiner* — Steven Sax
(74) *Attorney, Agent, or Firm* — Lowenstein Sandler LLP

(57) ABSTRACT

Systems and methods are disclosed for providing content presentation elements in conjunction with a media content item. In one implementation, a processing device receives a request for a media content item. The processing device identifies one or more elements of a content presentation context associated with the request. The processing device provides, in response to the request, at least one of the one or more elements of the content presentation context in conjunction with the media content item.

20 Claims, 7 Drawing Sheets

(56) References Cited

U.S. PATENT DOCUMENTS

| | | | |
|---|---|---|---|
| 2010/0214238 A1* | 8/2010 | Christoph | B60K 35/00 345/173 |
| 2010/0274815 A1* | 10/2010 | Vanasco | G06F 17/30867 707/798 |
| 2010/0325646 A1* | 12/2010 | Alhadeff | G06Q 30/02 725/10 |
| 2012/0110515 A1* | 5/2012 | Abramoff | G06F 17/30994 715/854 |
| 2012/0331385 A1* | 12/2012 | Andreas et al. | 715/716 |
| 2013/0007122 A1* | 1/2013 | Su | G06Q 50/01 709/204 |
| 2013/0011009 A1* | 1/2013 | Chen | G06K 9/00979 382/103 |
| 2013/0024754 A1* | 1/2013 | Darby et al. | 715/201 |
| 2013/0086170 A1* | 4/2013 | Skelton et al. | 709/204 |
| 2013/0159859 A1* | 6/2013 | Lee et al. | 715/719 |
| 2013/0185143 A1* | 7/2013 | Damman | H04N 21/2541 705/14.41 |
| 2013/0268829 A1* | 10/2013 | Lansford et al. | 715/205 |
| 2013/0290149 A1* | 10/2013 | Rashwan | G06Q 30/0641 705/27.1 |
| 2013/0346183 A1* | 12/2013 | Chandra et al. | 705/14.41 |
| 2014/0040756 A1* | 2/2014 | Bukurak | G06F 3/017 715/741 |
| 2014/0040769 A1* | 2/2014 | Lazaridis | G06F 3/0483 715/752 |
| 2014/0074836 A1* | 3/2014 | Adams et al. | 707/736 |
| 2014/0089801 A1* | 3/2014 | Agrawal | G06F 3/0484 715/719 |
| 2014/0108562 A1* | 4/2014 | Panzer | G06Q 50/01 709/206 |
| 2014/0198055 A1* | 7/2014 | Barkway | G06F 3/04883 345/173 |
| 2014/0259074 A1* | 9/2014 | Ansari | H04N 21/482 725/50 |
| 2014/0279257 A1* | 9/2014 | Fine | G06Q 30/0625 705/26.62 |
| 2014/0297739 A1* | 10/2014 | Stein et al. | 709/204 |

* cited by examiner

PROVIDING CONTENT PRESENTATION ELEMENTS IN CONJUNCTION WITH A MEDIA CONTENT ITEM

TECHNICAL FIELD

Aspects and implementations of the present disclosure relate to data processing, and more specifically, to providing content presentation elements in conjunction with a media content item.

BACKGROUND

Audio and video content can be stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a request for a media content item. The processing device identifies one or more elements of a content presentation context associated with the request. The processing device provides, in response to the request, at least one of the one or more elements of the content presentation context in conjunction with the media content item.

In another aspect, a processing device receives one or more elements of a content presentation context associated with a request for a media content item. The processing device provides at least one of the one or more elements of the content presentation context in conjunction with the media content item

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to providing content presentation elements in conjunction with a media content item. The systems and methods disclosed can be applied to media content such as audio and/or video content, images, and/or any other content that can be collected and/or disseminated such as via a media sharing service or website. More particularly, many social networking services enable users to 'share' or disseminate media content items (such as streaming videos that are stored at a media sharing service) via links and/or embedded media players that can be incorporated within the social networking service (e.g., within a webpage or application associated with a particular social network). The sharing of such media content items can be advantageous for both the media sharing service (by increasing viewership of the media content items provided by the media sharing service) and for the social network (by increasing user engagement with the social network). In many scenarios, upon selecting a link presented within a social network which corresponds to a media content item, an interface of a media sharing service is initiated (e.g., a new web browser tab or window, a separate mobile application, etc.). However, the interface of the media sharing service that is initiated often contains little or no content that pertains to or reflects the context within which the selected link was originally presented (e.g., within a social networking interface, which may contain posts or messages from other users that pertain to the media content item).

Accordingly, described herein in various embodiments are technologies that enable providing content presentation elements in conjunction with a media content item. For example, upon selection of a link provided within a social networking service that corresponds to a media content item, various elements (e.g., the text of a post presented on the social networking service, images presented on the social networking site or service, etc.) of the content presentation context within which the link is provided can be identified. Having identified various elements of the content presentation context of such a link, one or more of such elements can be incorporated within an interface of a media sharing service within which the media content item (e.g. a video) corresponding to the selected link is presented. In doing so, a user selecting a link provided within a social networking service that corresponds to a media content item can be presented with both the media content item as well as various elements of the social networking service within which the link was originally selected, thereby providing the user with an interface that more fully reflects the context within which the link to the media content item was originally discovered/selected.

Figure 1:
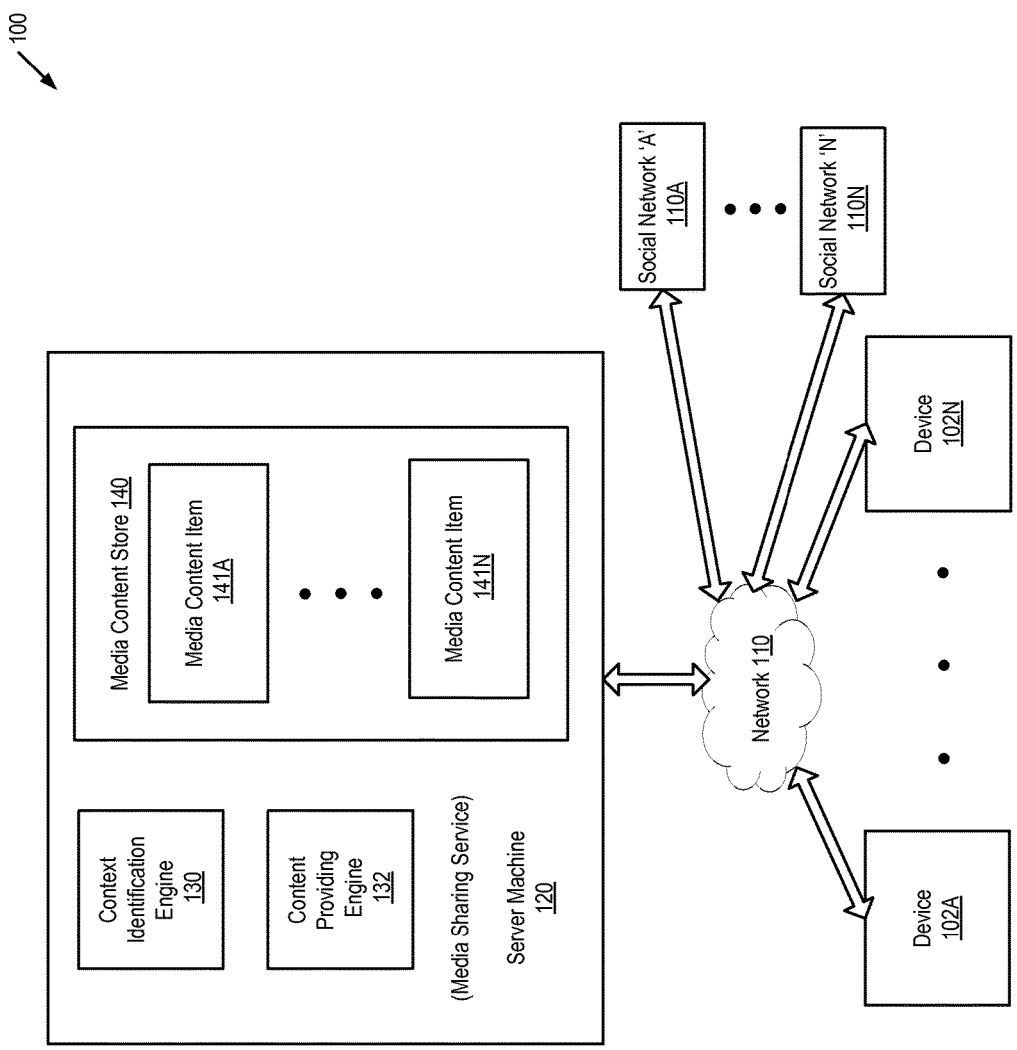
FIG. 1 depicts an illustrative system architecture, in accordance with one implementation of the present disclosure.

FIG. 1 depicts an illustrative system architecture 100, in accordance with one implementation of the present disclosure. The system architecture 100 includes user devices 102A-102N, social networking services 110A-110N and server machine 120. These various elements or components can be connected to one another via network 110, which can be a public network (e.g., the Internet), a private network (e.g., a local area network (LAN) or wide area network (WAN)), or a combination thereof.

User devices 102A-102N can be wireless terminals (e.g., smartphones, etc.), personal computers (PC), laptops, tablet computers, or any other computing or communication devices. The user devices 102A-102N may run an operating system (OS) that manages hardware and software of the user devices 102A-102N. Various applications, such as mobile applications ('apps'), web browsers, etc. (not shown) may run on the client machines (e.g., on the OS of the client machines). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the user device 102. The user devices 102A-102N can be geographically distributed anywhere throughout the world.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as context identification engine 130, content providing engine 132, and media content store 140. The components can be combined together or separated in further components, according to a particular implementation. It should be noted that in some implementations, various components of server machine 120 may run on separate machines. Moreover, some operations of certain of the components are described in more detail below with respect to FIG. 2.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Media content store 140 can include media content items 141A-141N. In certain implementations, media content items 141A-141N can correspond to media content itself (e.g., audio clips, video clips, images, etc.) and can be provided, for example, by a media content provider. Moreover, in certain implementations, server machine 120 can be configured to allow viewers wishing to access or view such media content items to do so via one or more webpages and/or applications provided by the media sharing service and/or via one or more embedded media viewers that can be incorporated within other webpages and/or applications.

Social networks 110A-110N can be one or more servers, computers, devices, etc., that provide a framework for social networking services, such as those that enable users to communicate and/or share information with one another. In certain implementations, each social network can provide a website and/or an application that enables users to utilize the functionality provided by the social network. Moreover, in certain implementations various social networks can enable users to share or otherwise disseminate media content items to other users, such as by providing one or more links to such media content items within posts, pages, and/or any other such interfaces provided by the social network, and/or by embedding such media content items within such posts, pages, and/or interfaces.

As described herein, a selection of a link (which is incorporated within a content presentation context such as an interface of a social networking service 110) to a media content item 141 can be received. In certain implementations, such operations can be performed by and/or in conjunction with context identification engine 130. In response to the selection, one or more elements of the content presentation context can be identified and provided in conjunction with the media content item, such as by and/or in conjunction with content providing engine 132, as described herein.

Figure 2:
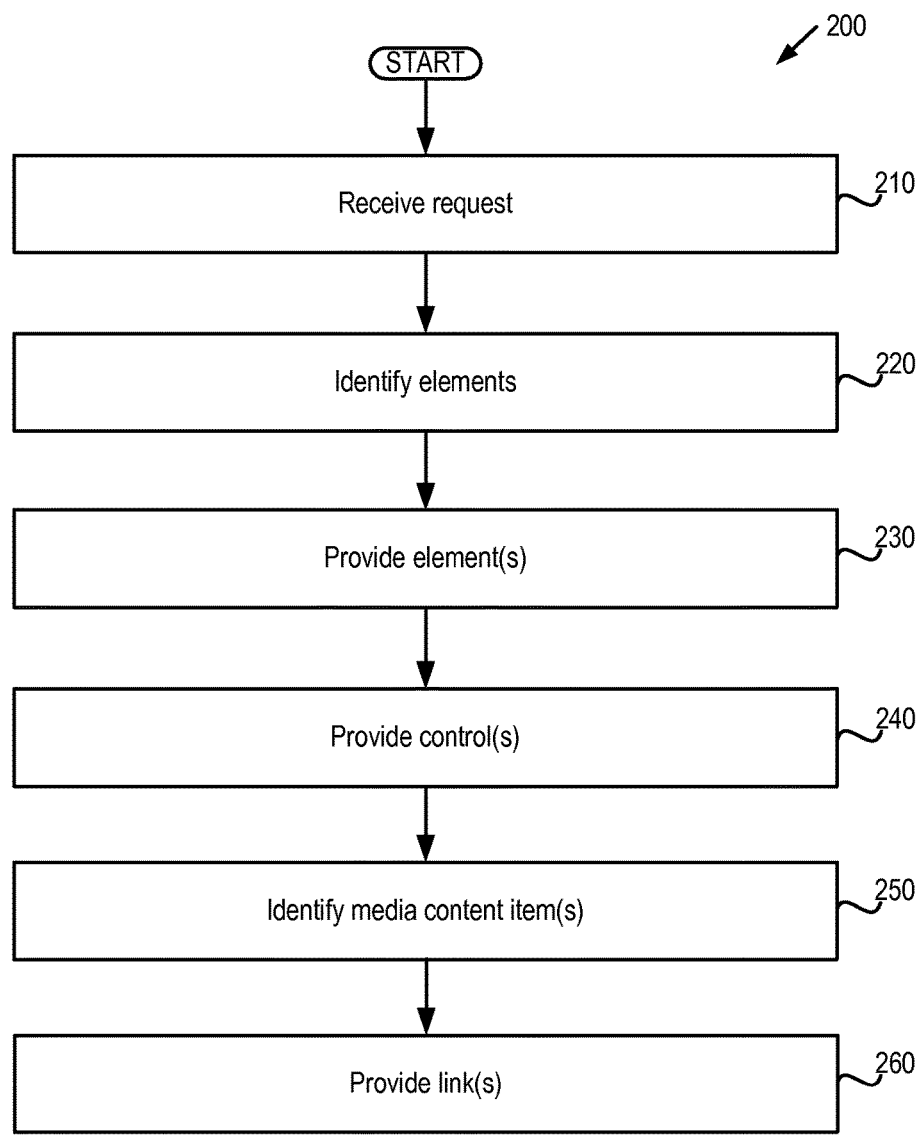
FIG. 2 depicts a flow diagram of aspects of a method for providing content presentation elements in conjunction with a media content item.

FIG. 2 depicts a flow diagram of aspects of a method 200 for providing content presentation elements in conjunction with a media content item. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations, one or more blocks of FIG. 2 may be performed by another machine. For example, in various alternative implementations, the method can be performed at a social network 110 and/or a user device 102 (i.e., the method or various aspects thereof can be performed locally at the social network 110 and/or device 102 rather than in communication with a server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 3:
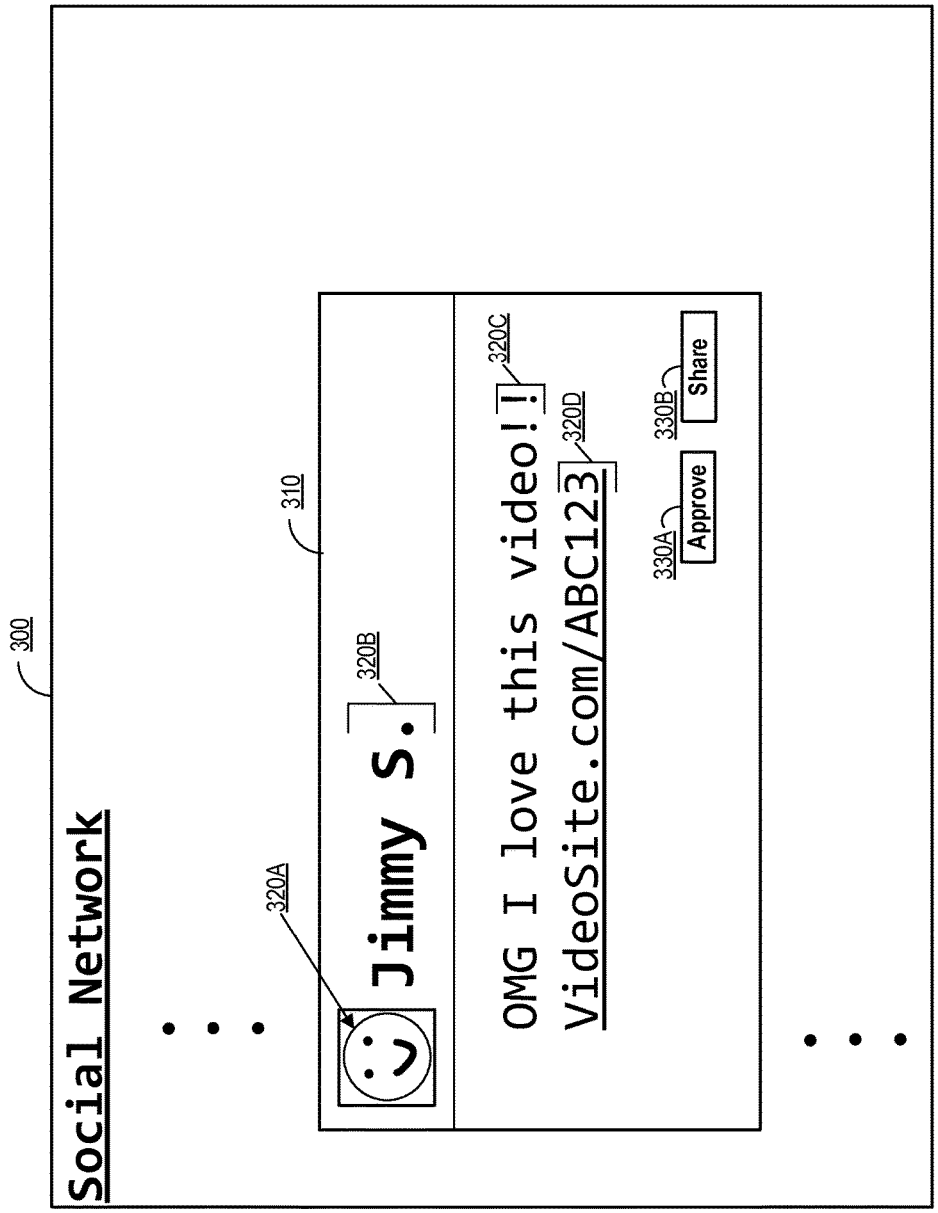
FIG. 3 depicts an exemplary user interface of a social networking service that incorporates a link that corresponds to a media content item, in accordance with one implementation of the present disclosure.

At block 210, a request can be received. In certain implementations, such a request can be a request for a media content item received by media sharing service 120. Moreover, in certain implementations such a request can be received based on/in response to a selection of a link, such as a link to a media content item (e.g., a video). In certain implementations such a link can be incorporated within a content presentation context. Examples of such a content presentation context include, but are not limited to: a third-party platform (e.g., a social networking site or service 110) and/or any other such context within which content such as links (e.g., one or more hyperlinks to a media content item 141 or thumbnail links of a media content item 141) can be posted by a user, disseminated to (e.g., shared with) with other users, and/or otherwise incorporated into the third-party platform. By way of illustration, as shown in FIG. 3, an example interface 300 of a social networking service can incorporate a link 320D that corresponds to a media content item 141. Such media content items (e.g., video content, audio content, images, etc.) can be stored by a media sharing service 120 (e.g., within media content store 140) and made available to users for viewing directly via the media sharing service (e.g., within a website or application provided by the media sharing service). In one aspect, block 210 is performed by context identification engine 130.

For example, as shown in FIG. 3 interface 300 of a social networking site or service ('Social Network') can include a post or message 310. Such a post 310 can incorporate elements including but not limited to identifying information pertaining to the author of the post (e.g., an icon/picture 320A and/or a username 320B), and the text/content of the post itself 320C ("OMG . . . "). Additionally, such a post can also incorporate one or more hyperlinks 320D ("VideoSite.com/ABC123"), which, as noted, can correspond to a media content item 141 stored and/or provided by a media sharing service 120. Post 310 and/or interface 300 can also incorporate various controls (e.g., controls 330A and 330B). In certain implementations, such controls 330 can correspond to one or more buttons, icons, and/or any other such selectable controls associated with various actions or operations that can be taken, such with respect to one or more social networking services 110. By way of illustration and as depicted in FIG. 3, control 330A ('Approve') can correspond to an operation that enables a user to provide feedback within/in relation to the social network (e.g., with respect to a particular post) while control 330B ('Share') can correspond to an operation that enables a user to share or otherwise disseminate content (e.g., a post) with other users within/in relation to the social network.

At block 220, one or more elements of a content presentation context can be identified. In certain implementations, such a content presentation context can be a content presentation context associated with the request (such as the request received at block 210). For example, a selection of a link to a media content item and/or the link itself can be processed. That is, it can be appreciated that one or more aspects or elements associated with a content presentation context of the request for a media content item (e.g., via a selection of a link to a media content item) can be processed in order to identify or otherwise determine various forms of contextual information associated with the selection and/or the link itself. For example, it can be appreciated that a link (e.g., hyperlink 320D as shown in FIG. 3) included within a web page or application can be configured to incorporate one or more references to and/or elements/aspects of the content presentation context with respect to which the link is present. For example, such a link can be configured such that, upon selection, one or more references to the content presentation context (e.g., a reference to the page/application within which the link is provided) can be appended to and/or otherwise incorporated with respect to the link itself (and thus transmitted, together with the link, to media sharing service 120). In doing so, upon receiving a selection of such a link (e.g., to a media content item), various elements of the content presentation context within which (or with which) the link is provided can be identified. Examples of such elements include, but are not limited to: textual content (e.g., the text of a post presented on a social networking site or service, such as text 320C as shown in FIG. 3), media content (e.g., images presented on a social networking site or service, such as image 320A, as shown in FIG. 3) and/or any other such content that can be incorporated within a content presentation context such as a social networking site or service. In one aspect, block 220 is performed by context identification engine 130.

Moreover, in certain implementations, one or more of the referenced elements can be retrieved from the content presentation context within which such elements are incorporated (e.g., a social networking site or service). For example upon receiving a request for a media content item, such as via a selection of a link to a media content item (e.g., link 320D incorporated within post 310 provided within an interface 300 of a social networking service), one or more aspects of the website, service, application, etc. within which the link is incorporated can be analyzed or processed in order to identify or otherwise determine various elements of the content presentation context of the link (e.g., various elements included within the social networking service, such as elements 320A-D as shown in FIG. 3). By way of illustration, one or more aspects of the source code (e.g., HTML) of a webpage or a UI document (e.g., interface 300 as shown in FIG. 3) of a social networking site within which a link to a media content item (e.g., link 320D) is incorporated can be parsed or otherwise analyzed to identify one or more UI aspects, such as the text of a post or message presented on such a UI (e.g., text 320C), media content (e.g., icon/image 320A) presented on such a UI, etc.

At block 230, one or more elements of a content presentation context (such as the elements identified at block 220) can be provided. In certain implementations, the referenced elements can be provided in response to a request/selection (such as the request received at block 210). Moreover, in certain implementations, the referenced elements can be provided in conjunction with a media content item (such as the media content item corresponding to the link selected at block 210). For example, one or more elements of the content presentation context (such as the elements identified at block 220) can be provided together, in a single interface, with a media content item (such as the media content item corresponding to the link selected at block 210). In doing so, the user can be presented with both the media content item that corresponds to the selected link, as well as various elements that originate from the content presentation context with respect to which the request was received/within which the link was presented. In one aspect, block 230 is performed by content providing engine 132.

Figure 4:
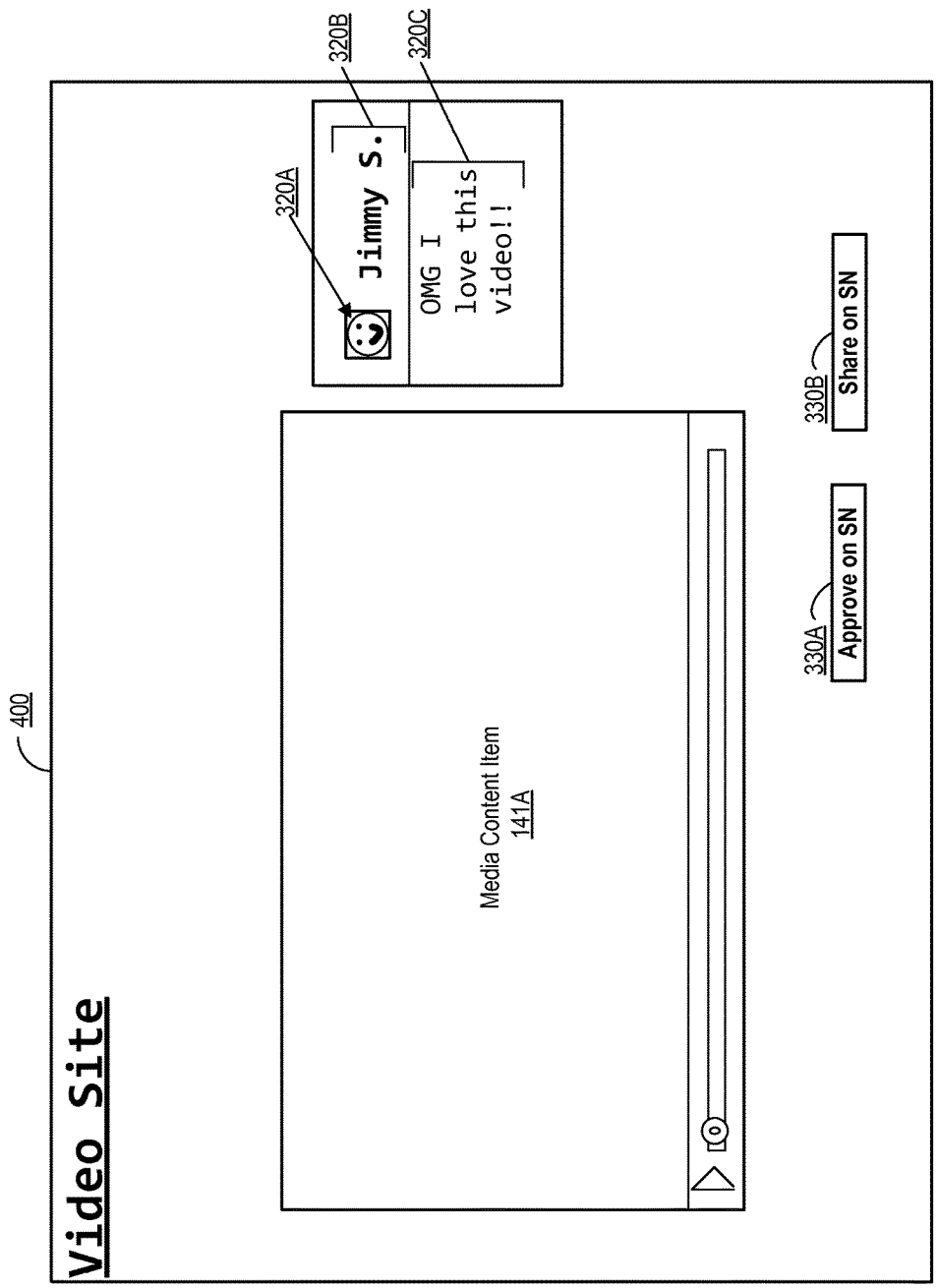
FIG. 4 depicts an exemplary user interface of a media sharing/streaming site or service, in accordance with one implementation of the present disclosure.

For example, FIG. 4 depicts an interface 400 of a media sharing/streaming site or service ('Video Site'), such as can be initiated or launched (e.g., within a web browser interface, mobile application, etc.) in response to the selection of a hyperlink (e.g., link 320D as depicted in FIG. 3). As shown in FIG. 4, interface 400 can include a media content item 141A (e.g., a video), as well as various elements included within the content presentation context within which the link to the referenced media content item was presented (e.g., elements included within post 310 and/or interface 300 as shown in FIG. 3). For example, an icon/image 320A, username 320B, and text content 320C included within post 310 can be included within interface 400, as shown in FIG. 4. In doing so, the media content item 141A that corresponds to a selected link (e.g., link 320D as shown in FIG. 3) can be provided together with various elements (e.g., 320A-C) originating from the content presentation context with respect to which media content item request was received/ within which the link was presented.

Additionally, in certain implementations, one or more elements of the content presentation context can be provided in relation to various annotations, such as annotations that are associated with a media content item (such as the media content item corresponding to the link selected at block 210). That is, it can be appreciated that various media sharing services/sites can enable users to provide annotations (e.g., comments) in relation to a particular media content item stored by the service, and such annotations can be subsequently presented to other users when viewing the referenced media content item. Accordingly, in certain implementations, various elements (such as the elements identified at block 220) included within the content presentation context within which a link to a media content item is presented can be incorporated in relation to various annotations, such as annotations that are associated with the referenced media content item (such as the media content item corresponding to the request received at block 210).

Figure 5:
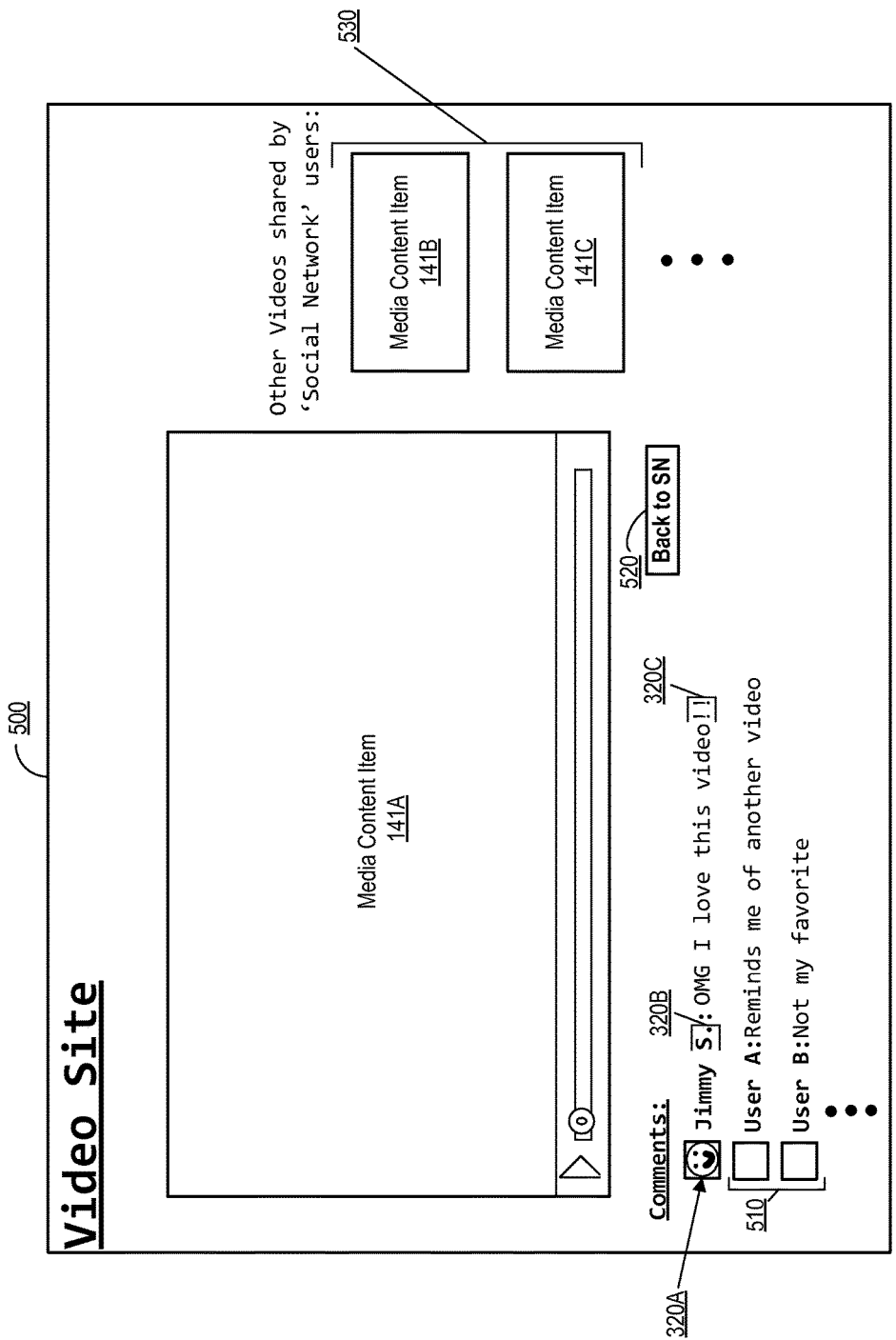
FIG. 5 depicts an exemplary user interface of a media sharing/streaming site or service, in accordance with one implementation of the present disclosure.

For example, FIG. 5 depicts an interface 500 of a media sharing/streaming site or service ('Video Site'), such as can be initiated or launched (e.g., within a web browser interface, mobile application, etc.) in response to the selection of a link (e.g., link 320D as depicted in FIG. 3). As shown in FIG. 5, interface 500 can include a media content item 141A (e.g., a video), as well as various elements included within the content presentation context within which the link to the referenced media content item was presented (e.g., elements included within post 310 and/or interface 300 as shown in FIG. 3). For example, an icon/image 320A, username 320B, and text content 320C included within post 310 can be provided within interface 500 in relation to various annotations or comments 510 that are associated with media content item 141A, as shown in FIG. 5. In doing so, various elements (e.g., 320A-C) originating from the content presentation context within which a selected link was presented can be provided together with/in relation to various annotations (e.g., comments 510) associated with the media content item (e.g., video 141A).

Moreover, in certain implementations one or more elements of the content presentation context can be prioritized, such as in relation to one or more annotations, such as those associated with the media content item. For example, as shown in FIG. 5, various elements (e.g., 320A-C) originating from the content presentation context with respect to which the request was received/within which a selected link was presented can be prioritized, such as by presenting such elements in a relatively more visible or prominent position as compared to various other annotations (e.g., comments 510) associated with the media content item (e.g., video 141A). In doing so, such elements which originate from the content presentation context with respect to which the request was received/within which a selected link was presented (and which may thus be of particular interest and/or have particular relevance/significance to the selecting user) can be presented in a manner that may be more visible or prominent to the selecting user (e.g., towards the top or at the top of an ordered list of comments).

Moreover, in certain implementations, an interface can be generated. Such an interface can include one or more elements of the content presentation context (such as the elements identified at block 220) and/or the media content item (such as the media content item corresponding to the request received/link selected at block 210). That is, in certain implementations, in response to a request/selection (such as the request/selection received at block 210), one or more commands can be generated and/or provided, such as to generate and/or modify one or more interfaces, such as a web browser, application window, etc., that correspond to a third-party platform (e.g., a social networking site/service) and/or a media sharing site/service. Moreover, in certain implementations, a media content item (such as the media content item corresponding to the request received/link selected at block 210) can be provided within a first interface while one or more elements of a content presentation context (such as the elements identified at block 220) can be provided within a second interface that is presented in parallel to the first interface.

Figure 6:
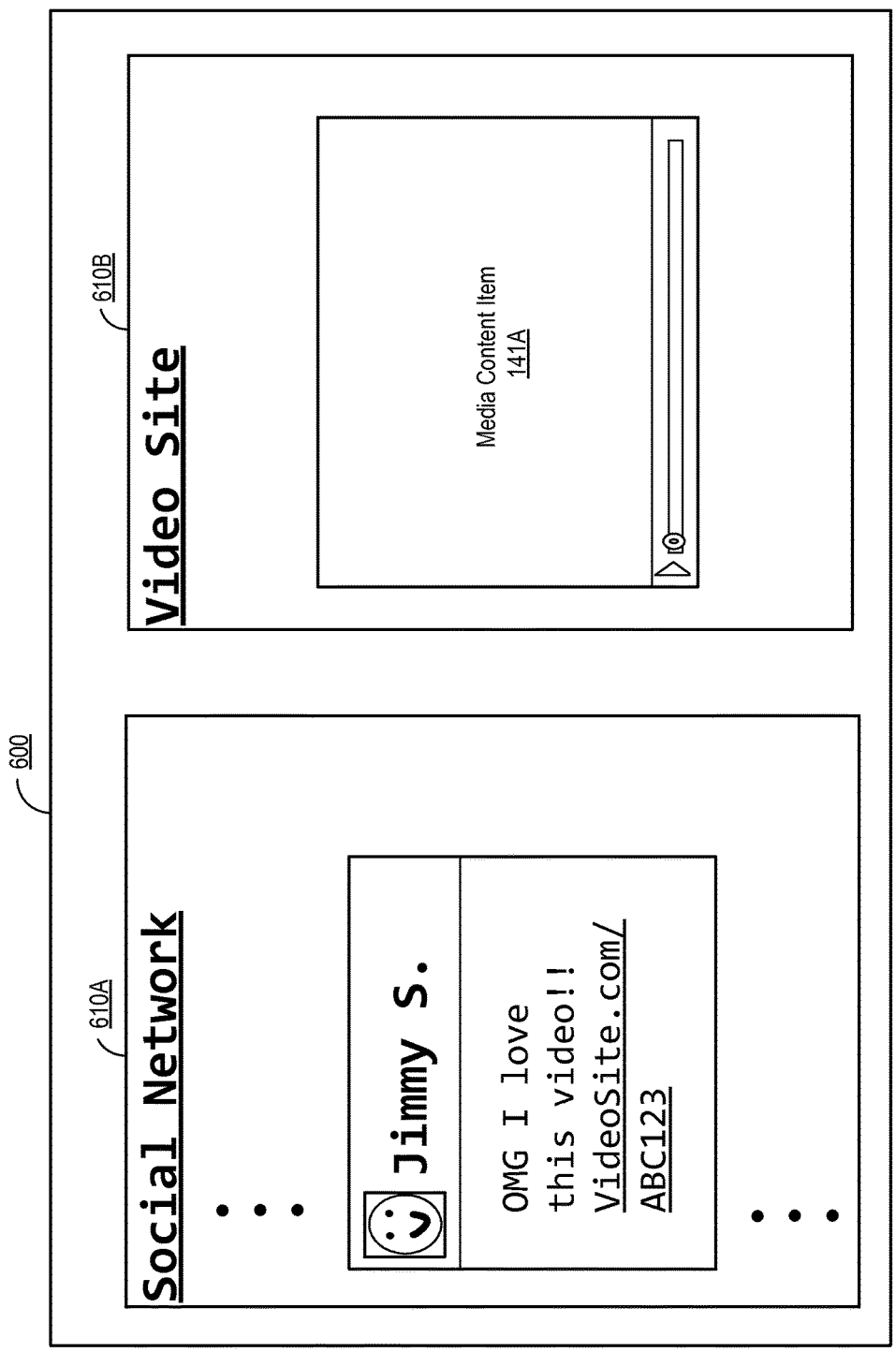
FIG. 6 depicts an exemplary user interface that includes both an interface of a social networking site or service and an interface of a media sharing/streaming site or service, in accordance with one implementation of the present disclosure.

For example, FIG. 6 depicts an interface 600 that includes both an interface 610A of a social networking site or service ('Social Network') (such as is depicted in FIG. 3) and an interface 610B of a media sharing/streaming site or service ('Video Site') (such as is depicted in FIG. 4). Such an interface 600 can be initiated or launched (e.g., within a web browser interface, mobile application, etc.) in response to the selection of a link (e.g., link 320D as depicted in FIG. 3), such as by launching/initiating an interface corresponding to the selected link (e.g., interface 610B) and/or by modifying one or more display parameters of the interface containing the link (e.g., interface 610A). As shown in FIG. 6, respective interfaces 610A and 610B can be displayed in parallel within interface 600, thereby enabling a user to be presented with both a media content item 141A (e.g., a video), as well as the content presentation context within which the selected link to the referenced media content item was presented.

At block 240, one or more controls can be provided. In certain implementations, such control(s) can be provided in conjunction with one or more elements of the content presentation context (such as the elements identified at block 220). That is, it can be appreciated that various controls (e.g., selectable icons, buttons, etc.) can be provided in various settings (e.g., within an interface containing various content items) in order to enable users to initiate various actions that pertain to a social networking service (e.g., indicating approval or disapproval, disseminating such content within the social networking service, etc.). In certain implementations, such content interaction controls can include one or more content dissemination controls (e.g., a control that enables a user to 'share' or otherwise disseminate the media content item via a particular social networking service) and/or content feedback controls (e.g., a control that enables a user to approve, disapprove, or otherwise rate the media content item, such as in conjunction with a particular social networking service). Moreover, in certain implementations, such control(s) can include a link to the content presentation context (such as the content presentation context with respect to which the request was received/within which the link selected at block 210 was incorporated). By way of further example, such control(s) can include one or more controls associated with an operation of the content presentation context, such as a control that, upon selection, enables a user to perform one or more operations in relation to a social networking service (e.g., to initiate a content posting and/or the dissemination or 'sharing' of the media content item within the social networking service). In one aspect, block 240 is performed by content providing engine 132.

By way of illustration, it can be appreciated with reference to FIG. 3 that an interface 300 of a social networking site or service ('Social Network') can include various controls 330A, 330B that, when selected, can enable a user to provide feedback regarding a post, etc. ('Approve') and/or to disseminate such content to other users ('Share'). Accordingly, as depicted in FIG. 4, upon initiating/launching a media sharing/streaming site or service ('Video Site') in response to a selection of a hyperlink (e.g., link 320D as depicted in FIG. 3), one or more of the referenced control(s) can be provided in conjunction with the media content item corresponding to the selected link and/or one or more elements of the content presentation context within which the link was originally selected (e.g., 320A-D as depicted in FIG. 4). In doing so, in addition to presenting (e.g., within a single interface) a media content item that corresponds to a selected link together with elements originating from the content presentation context (e.g., a social networking service) within which the link was presented, various controls can be provided that, when selected, enable a user to initiate/perform one or more operations in relation to the social networking service (e.g., 'Approve on SN' and 'Share on SN,' where 'SN' refers to 'Social Network').

By way of further illustration, in certain implementations upon initiating/launching a media sharing/streaming site or service ('Video Site') in response to a selection of a hyperlink (e.g., link 320D as depicted in FIG. 3), one or more control(s) can be provided (e.g., in conjunction with the media content item corresponding to the selected link and/or one or more elements of the content presentation context within which the link was originally selected), such as a control that, when selected, can enable a user to navigate and/or return to the content presentation context (e.g., the social networking service) within which the selected link was originally presented. For example, as shown in FIG. 5, control 520 ('Return to SN,' where 'SN' refers to 'Social Network'), which, upon selection, can enable a user to navigate/return to the content presentation context within which the selected link was originally presented (e.g., interface 300 as shown in FIG. 3), can be incorporated within interface 500. In doing so, in addition to presenting (e.g., within a single interface) a media content item that corresponds to a selected link together with elements originating from the content presentation context (e.g., a social networking service) with respect to which the request was received/within which the link was presented, a control can be provided that, when selected, enables a user to return to the content presentation context (e.g., the social networking service) within which the selected link was originally presented. Such functionality can be advantageous, for instance, with respect to operating systems (e.g., mobile device operating systems) that do not otherwise provide an efficient mechanism for a user to navigate from one application/interface (e.g., 'Video Site' interface 500) to another (e.g., 'Social Network' interface 300).

At block 250, one or more media content items that are associated with the content presentation context (such as the content presentation context with respect to which the request was received/within which the link selected at block 210 was incorporated) can be identified. For example, in certain implementations, one or more media content items (such as those stored in media content store 141) that were previously presented/viewed in response to the media content item request/selection of a link provided within the same content presentation context (e.g., within the same social networking service, in relation to the same user of the social networking service, etc.) can be identified (e.g., based on one or more viewing histories that can be maintained, for example, in relation to each respective media content item 141, such as by media content store 140). In one aspect, block 250 is performed by content providing engine 132.

It should be noted that in situations in which the systems discussed herein collect personal information about users, or may make use of personal information, the users may be provided with an opportunity to control whether programs or features collect user information (e.g., information about a user's media viewing history, interests, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

At block 260, one or more links to one or more media content items (such as the media content items identified at block 250) can be provided. In certain implementations, such link(s) can be provided in conjunction with a media content item (such as the media content item that corresponds to the request received/link selected at block 210). For example, as depicted in FIG. 5, having identified (such as at block 250) one or more media content items that are associated with the content presentation context within which the link selected at block 210 was incorporated, such identified media content items (e.g., media content items 530 as shown in FIG. 5) can be provided. In doing so, in addition to being presented with a media content item (e.g., video 141A) in response to a selection of a link provided within a social networking service, the selecting user can also be presented with links to additional media content items that correspond to other media content items that other users may have viewed in response to a selection of link(s) provided within the same social networking service (and which thus may be of particular relevance and/or interest to the selecting user). In one aspect, block 260 is performed by content providing engine 132.

Figure 7:
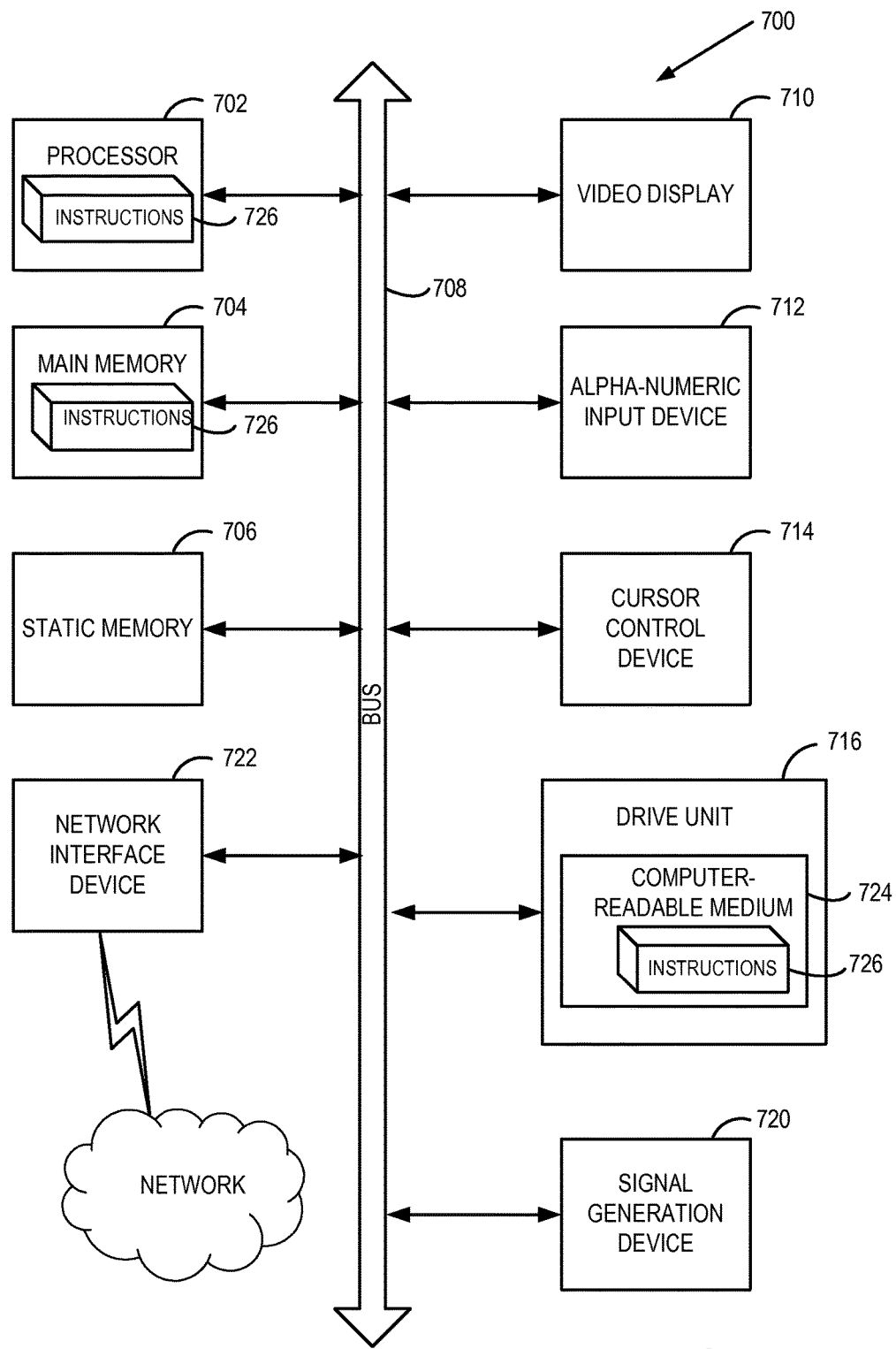
FIG. 7 depicts a block diagram of an illustrative computer system operating in accordance with aspects and implementations of the present disclosure.

FIG. 7 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable medium 724 on which is stored one or more sets of instructions 726 (e.g., instructions executed by collaboration manager 225, etc.) embodying any one or more of the methodologies or functions described herein. Instructions 726 may also reside, completely or at least partially, within the main memory 704 and/or within the processor 702 during execution thereof by the computer system 700, the main memory 704 and the processor 702 also constituting computer-readable media. Instructions 726 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "providing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method for a media sharing platform to incorporate context of a post from any of a plurality of different social network platforms into a media presentation interface of the media sharing platform, the method comprising:

receiving, by a processing device of the media sharing platform and via a post displayed in a social network user interface of one of the plurality of different social networking platforms, a request for a media content item referenced in the post, the post displayed in the social network user interface comprising one or more user interface elements and one or more controls, the media sharing platform hosting at least one of video content or audio content and being external to the one of the plurality of different social networking platforms;

identifying, by the processing device of the media sharing platform, the one or more user interface elements and one or more controls in the post displayed in the social network user interface of the one of the plurality of different social networking platforms; and providing, by the processing device of the media sharing platform and in response to the request, the one or more controls and at least one of the one or more user interface elements of the post displayed in the social network user interface for presentation within a media presentation interface of the media sharing platform, the media presentation interface comprising a media player to play the media content item, wherein a functionality of the one or more controls during a presentation in the social network user interface is the same as during a presentation in the media presentation interface, and wherein each of the one or more controls is a selectable user interface element, which when selected by a user within the media presentation interface, initiates an operation pertaining to the post within the social network user interface.

2. The method of claim 1, wherein the request is received in response to a selection of a link incorporated within the post displayed in the social network user interface.

3. The method of claim 1, wherein identifying one or more elements comprises retrieving the at least one of the one or more elements from the post displayed in the social network user interface.

4. The method of claim 1, wherein providing at least one of the one or more elements of the post displayed in the social network user interface comprises providing (a) at least one of the one or more elements and (b) the media content item within a single interface.

5. The method of claim 1, wherein providing at least one of the one or more elements of the post displayed in the social network user interface comprises providing at least one of the one or more elements of the content presentation context in relation to one or more annotations associated with the media content item.

6. The method of claim 5, wherein the at least one of the one or more elements of the post displayed in the social network user interface is prioritized in relation to one or more annotations associated with the media content item.

7. The method of claim 1, wherein providing at least one of the one or more elements of the post displayed in the social network user interface comprises generating an interface comprising (a) at least one of the one or more elements and (b) the media content item.

8. The method of claim 1, wherein providing at least one of the one or more elements of the post displayed in the social network user interface comprises providing the media content item within a first interface and providing at least one of the one or more elements within a second interface that is presented in parallel to the first interface.

9. The method of claim 1, wherein the control comprises a link to the content presentation context.

10. The method of claim 1, further comprising:
identifying one or more media content items other than the media content item that are associated with the content presentation context; and
providing a link to at least one of the one or more media content items in conjunction with the media content item.

11. A system for a media sharing platform to incorporate context of a post from any of a plurality of different social network platforms into a media presentation interface of the media sharing platform, the system comprising:
a memory; and
a processing device, coupled to the memory, to:
receive, at a media sharing platform and via a post displayed in a social network user interface of one of the plurality of different social networking platforms, a request for a media content item referenced in the post, the post displayed in the social network user interface comprising one or more user interface elements and one or more controls, the one or more user interface elements comprising at least a portion of a message of the post and an identifier of a user associated with the post, the media sharing platform hosting at least one of video content or audio content and being external to the one of the plurality of different social networking platforms;
identify, by the media sharing platform, the one or more user interface elements and one or more controls in the post displayed in the social network user interface of one of the plurality of different social networking platforms; and
provide, by the media sharing platform and in response to the request, the one or more controls and at least one of the one or more user interface elements of the post displayed in the social network user interface for presentation within a media presentation interface of the media sharing platform, the media presentation interface comprising a media player to play the media content item, wherein a functionality of the one or more controls during a presentation in the media presentation interface is the same as during a presentation in the social network user interface, and wherein each of the one or more controls is a selectable user interface element, which when selected by a user within the media presentation interface, initiates an operation pertaining to the post within the social network user interface.

12. The system of claim 11, wherein the request is received in response to a selection of a link incorporated within the post displayed in the social network user interface.

13. The system of claim 11, wherein to identify one or more elements is to retrieve the at least one of the one or more elements from the post displayed in the social network user interface.

14. The system of claim 11, wherein to provide at least one of the one or more elements of the post displayed in the social network user interface is to provide at least one of the one or more elements in relation to one or more annotations associated with the media content item.

15. The system of claim 14, wherein the at least one of the one or more elements of the post displayed in the social network user interface is prioritized in relation to one or more annotations associated with the media content item.

16. The system of claim 11, wherein to provide at least one of the one or more elements of the post displayed in the social network user interface is to generate an interface comprising (a) at least one of the one or more elements and (b) the media content item.

17. The system of claim 11, wherein to provide at least one of the one or more elements of the post displayed in the social network user interface is to provide the media content item within a first interface and providing at least one of the one or more elements within a second interface that is presented in parallel to the first interface.

18. The system of claim 11, wherein one of the one or more controls allows the user to return to the post displayed in the social network user interface.

19. The system of claim 11, wherein the processing device is further to:
identify one or more media content items other than the media content item that are associated with the post displayed in the social network user interface; and
provide a link to at least one of the one or more media content items in conjunction with the media content item.

20. A non-transitory computer readable medium having instructions stored thereon that, when executed by a processor, cause the processor of a media sharing platform to incorporate context of a post from any of a plurality of different social network platforms into a media presentation interface of the media sharing platform, the processor is to:

receive, at a media sharing platform and via a post displayed in a social network user interface of one of the plurality of different social networking platforms, a request for a media content item referenced in the post, the post displayed in the social network user interface comprising one or more user interface elements and one or more controls, the one or more user interface elements comprising at least a portion of a message of the post and an identifier of a user associated with the post, the media sharing platform hosting at least one of video content or audio content and being external to the one of the plurality of different social networking platforms;

identify, by the media sharing platform, the one or more user interface elements and one or more controls in the post displayed in the social network user interface of the one of the plurality of different social networking platforms; and provide, by the processor of the media sharing platform and in response to the request, the one or more controls and at least one of the one or more user interface elements of the post displayed in the social network user interface for presentation within a media presentation interface of the media sharing platform, the media presentation interface comprising a media player to play the media content item, wherein a functionality of the one or more controls during a presentation in the media presentation interface is the same as during a presentation in the social network user interface, and wherein each of the one or more controls is a selectable user interface element, which when selected by a user within the media presentation interface, initiates an operation pertaining to the post within the social network user interface.

* * * * *